United States Patent

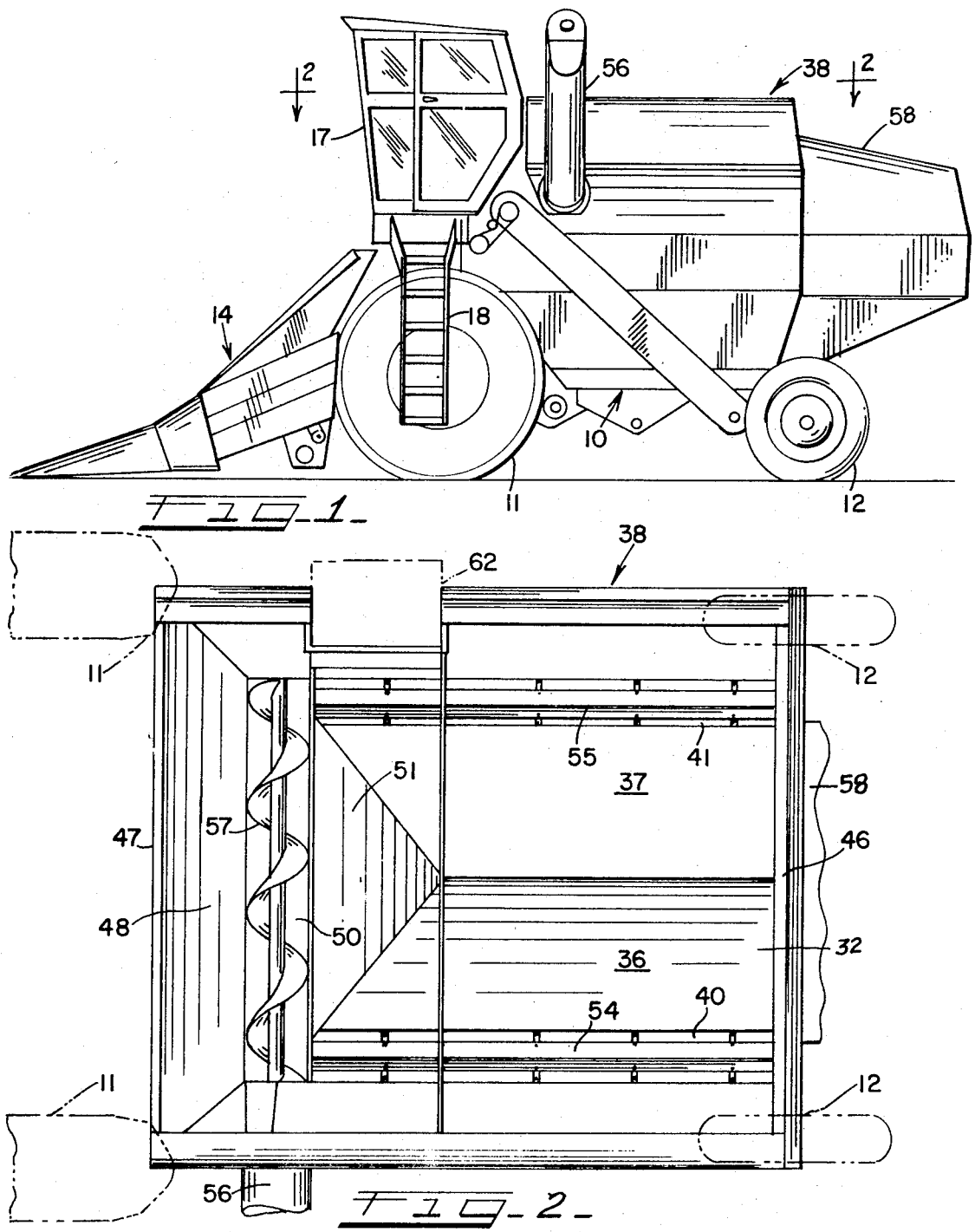

Maiste et al.

[15] 3,650,052

[45] Mar. 21, 1972

[54] CROP HARVESTING COMBINE

[72] Inventors: Arved Maiste; Melvin F. Robertson, both of Brantford, Ontario, Canada

[73] Assignee: White Motor Corporation of Canada Limited, Brantford, Ontario, Canada

[22] Filed: Feb. 24, 1970

[21] Appl. No.: 13,271

[30] Foreign Application Priority Data

Feb. 24, 1969 Canada....................................043,795

[52] U.S. Cl.............................................56/473.5
[51] Int. Cl. ...........................................A01d 75/00
[58] Field of Search.....................56/20, 21, 473.5; 214/519, 214/520, 521, 83.32

[56] References Cited

UNITED STATES PATENTS

| | | | |
|---|---|---|---|
| 3,152,702 | 10/1964 | Klemm et al............................ | 56/473.5 |
| 3,159,289 | 12/1964 | Tweedale............................... | 56/473.5 |
| 3,265,226 | 8/1966 | Malcolm................................ | 56/473.5 |

*Primary Examiner*—Antonio F. Guida
*Attorney*—Greist, Lockwood, Greenawalt & Dewey

[57] ABSTRACT

A crop harvesting combine which has a vehicle frame structure for supporting and housing threshing, separating and cleaning mechanisms and a built-in grain bin which is incorporated as an integral part of the frame structure with the floor of the bin providing a roof over the compartment in which the threshing cylinder, straw walkers, cleaning pans and associated devices are mounted, and the grain bin having cooperating augers in bottom troughs extending longitudinally and transversely of the bin for moving the clean grain to an unloading elevator at one end of the transverse trough.

3 Claims, 5 Drawing Figures

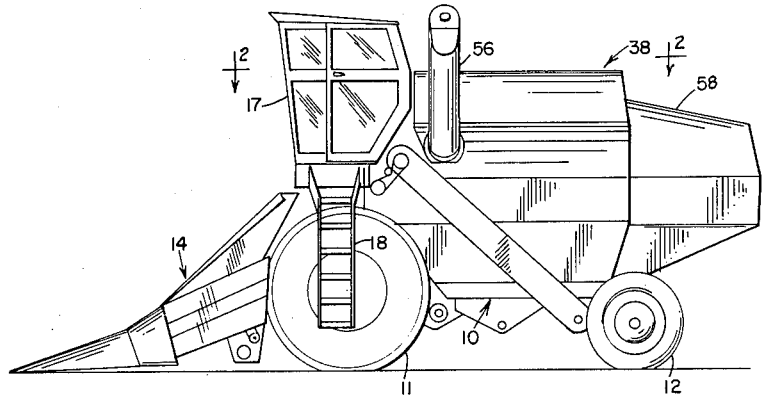

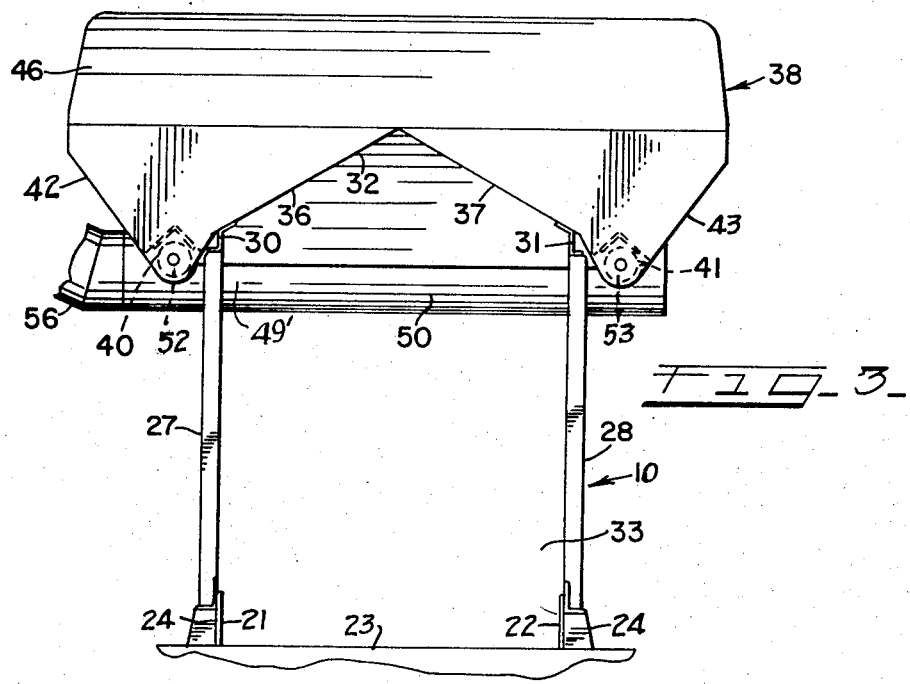
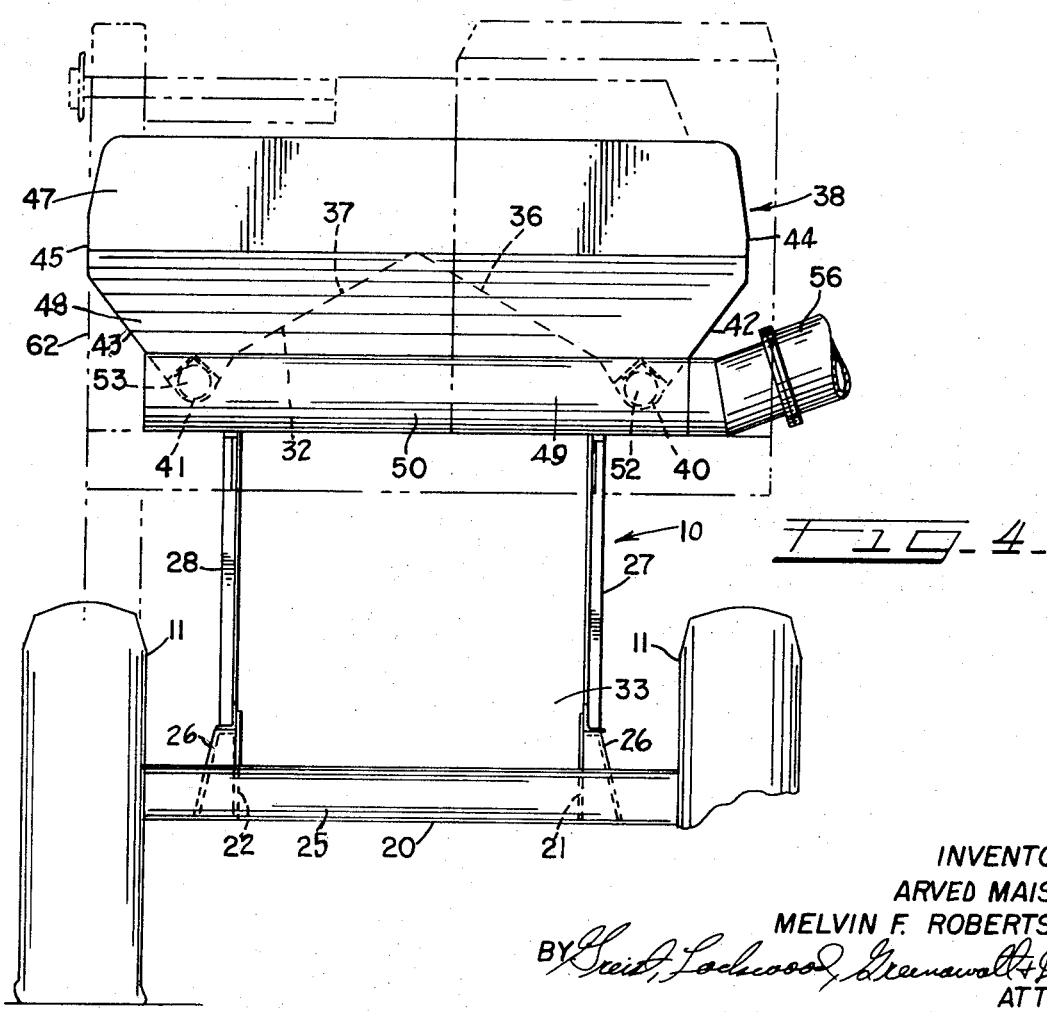

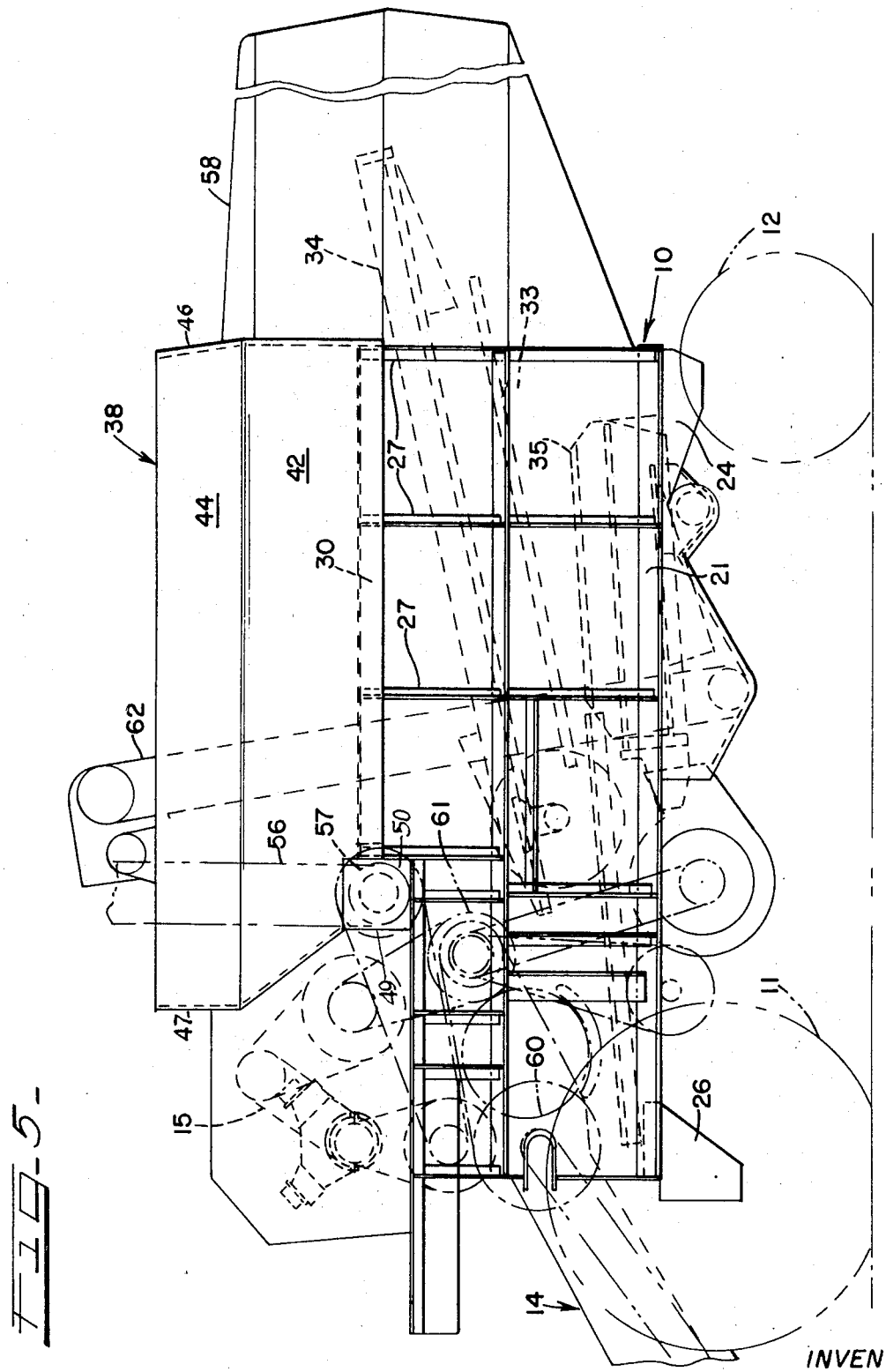

CROP HARVESTING COMBINE

This invention relates to agricultural machinery for use in handling field grown crops and is more particularly concerned with improvements in a combine for harvesting grain and similar crops.

It has been the practice heretofore in designing crop handling machinery of the harvesting combine type which is designed particularly to be supported on a self-propelled vehicular structure so that it may be readily moved about in the field where the crops are grown, to make provision for including with the crop gathering and harvesting apparatus a storage bin for receiving and temporarily storing the grain after it has been separated from the stalk and other waste, the latter being discarded or discharged in the field. Various crop harvesting combines have been developed in the design of which provision has been made for including a binlike receptacle for receiving the harvested grain which has been separated by the machine. Generally in these machines, as designed heretofore, the grain bin has been in the form of a separate unit attached to or supported in some manner on the harvesting vehicle. That is, the grain bin has been treated as an appendage and not as a basic or integral part of the machine frame structure with the result that when the grain bin has been placed on the top of the vehicle, the overall height of the machine has generally been increased to such an extent that the machine is rendered top-heavy. If the grain bin were placed on one side or the other of the machine, the load would, of course, be unevenly distributed and the vehicle would be hard to handle. It is a general object of this invention, therefore, to provide a harvesting combine which is designed to include as a basic or integral part of the machine frame structure an improved grain bin arrangement for storing up to a predetermined amount of the grain which is gathered and separated by the machine.

It is a more specific object of the invention to provide a crop harvesting combine wherein improved storage space in the form of a built-in storage compartment or bin is provided in the body of the machine for receiving the crop material after it has been gathered and separated from the stalk by operation of the associated apparatus in the machine so as to accumulate and store the material for subsequent unloading.

A still more specific object of the invention is to provide a crop harvesting combine having a body which includes built-in storage facilities for receiving and temporarily storing a quantity of grain or other crop material which the machine is adapted to harvest, wherein portions of the supporting frame structure are utilized to provide a built-in storage compartment in the vehicle body without unduly increasing the overall dimensions of the combine and with provision for obtaining a satisfactory distribution of weight when the compartment is partially or fully loaded with the harvested material.

Another object of the invention is to provide a vehicle having a frame structure for supporting crop threshing and cleaning devices which incorporates as a part of the frame structure dual purpose support elements so as to provide also a bin for storing the threshed and cleaned crop material without unduly increasing the overall height of the vehicle and arranged to efficiently utilize available space and provide for distribution of weight, when fully or partially filled, so that the load on the frame suspension is substantially balanced.

Another object of the invention is to provide a harvesting combine having a grain bin built into the structural framework with the major portion of the bottom thereof constituting an inverted V-shaped roof over a lower compartment which houses substantial portions of the threshing and cleaning mechanisms.

These and other objects and advantages of the invention will be apparent from a consideration of the crop harvesting combine which is shown by way of illustration in the accompanying drawings wherein:

FIG. 1 is a side elevation of a self-propelled crop harvesting combine for use in harvesting grain crops in the field, which incorporates the principal features of the invention;

FIG. 2 is a top plan view to a larger scale of a portion of the apparatus of FIG. 1, the view being taken on the line 2—2 of FIG. 1;

FIG. 3 is a partial rear end elevation of the combine with portions omitted;

FIG. 4 is a front end elevation of the combine with portions omitted and with other portions indicated in phantom line; and FIG. 5 is an elevational view, to a larger scale, of the main body portion of the combine of FIG. 1 with portions omitted or broken away.

Referring first to FIG. 1, there is illustrated a grain harvesting combine which embodies therein the improved features constituting the invention, the combine being in the form of a self-propelled vehicle designed particularly for use in harvesting grain crops.

The machine illustrated incorporates a vehicle main body structure 10 (FIGS. 1 and 5) supported on forward and rear wheel assemblies 11 and 12 with a crop cutting and gathering header 14 mounted at the forward end of the vehicle. The vehicle body structure 10 is designed to support on a platform at the forward end thereof a power drive unit or engine, indicated at 15 (FIG. 5), and an operator's cab 17 with a ladder 18 for convenience in entering the cab 17. The power unit 15 is connected in driving relation by means of suitable drive mechanisms with the front wheel assembly 11 and other elements of the machine which are required to be driven.

The main frame structure 10 is of generally rectangular configuration with a horizontally disposed bottom frame section 20 which includes longitudinally extending side beams 21 and 22 and suitable connecting cross frame members (not shown). The side beams 21 and 22 are connected at the rear end to the rear axle housing 23 by upstanding bracket structures 24 and at the front end to the front axle housing 25 by similar bracket structures 26. A plurality of longitudinally spaced upright side frame forming angle members or vertical struts 27 and 28 extend from the bottom side frame plates or beams 21 and 22 to longitudinally extending upper angle members 30 and 31 which connect the vertical struts 27 and 28 on each side of the frame. The angle members 30 and 31 terminate short of the front end of the frame and are connected to the bottom of a plate structure 32 extending transversely of the frame which is of inverted V-shape in cross section and which serves as a roof over a compartment forming area 33 below the same in which straw walkers, indicated at 34, and cleaning screens and pans, indicated at 35, are housed. The roof forming plate structure 32, which comprises plate members 36 and 37 also serves as part of the floor or bottom of a grain storage bin structure 38. The upwardly sloping bottom plates 36 and 37 of the bin structure 38 extend from the upper edges of the inside walls of longitudinal troughs 40 and 41 which are attached to the bottom wall plates 36 and 37 and the outside walls of which are connected at their top edges to the lower edges of upwardly and outwardly sloping bin side wall plates 42 and 43 which in turn are connected to or merge with generally vertical top side wall plates 44 and 45 so that the bin structure 38 overlies the frame structure 10 and extends on opposite sides thereof. A vertically extending or upstanding cross plate 46 closes the rear end of the bin structure 38 and an upstanding cross plate 47 closes the front end. The front cross plate 47 has an inwardly and downwardly sloping lower portion 48 which extends to the top edge of the front wall 49 of a transversely extending trough 50 which is attached to and extends below the bottom wall. The rear wall 49' of the trough 50 is connected to the lower edge of an upwardly and rearwardly inclined plate 51 connecting the front ends of the bottom wall forming plates 36 and 37. As shown in FIGS. 2, 4 and 5, the unloading through formation 50 extends somewhat below the front end of the longitudinal troughs 40 and 41 in which are adapted to be mounted augers 52 and 53 for moving grain to the unloading trough 50. The augers 52 and 53 have associated top shields 54 and 55. The unloading trough 50 connects at one end with an unloading spout 56 having the usual elevator mechanism (not shown) and an unloading auger 57 is mounted in the trough 50 for moving grain into the unloading spout when it is desired to unload the bin 38.

The bin rear cross plate 46 serves as a support for a hood 58 which extends rearwardly of the bin structure 38 and covers and protects projecting portions of the straw walker assembly 34. The forward or front portion of the bin 38 terminates short of the front end of the vehicle where the vehicle frame structure is designed to allow for mounting of the engine 15 and associated drive mechanisms, the mechanism for operator control of the machine, a seat for the operator and an operator's cab 17. The main frame structure 10 is covered with suitable side cover plates and provision is made adjacent the forward end of the vehicle for mounting a threshing cylinder, indicated at 60 (FIG. 5) and an associated beater, indicated at 61, the gathered material being delivered to the threshing cylinder 60 from the header 14 and advanced from the cylinder 60 to the beater 61 and thence to the straw walkers 34 and cleaning devices 35 below the latter. The machine includes a clean grain elevator assembly 62 (FIG. 4) for delivering the grain from the cleaning mechanism or devices 35 to the open top of the grain bin 38. The grain bin 38 may be provided with leveling augers (not shown) mounted on the top thereof to spread the grain in the bin. Suitable gear, chain or belt drive connections with the power unit 15 are provided for operating the moving elements of the apparatus.

While a self-propelled vehicle is shown in which the invention is incorporated, it is not intended to limit the use of the invention to the particular type of combine which is selected for illustrating the principles thereof.

In the use of the apparatus, the crop material is cut and fed to the harvesting or threshing elements and then to cleaning devices after which the cleaned grain is delivered to the storage bin for distribution therein by leveling augers, or the like. Thereafter, the grain is removed and discharged from the storage bin by the cross auger in the trough 50, which is mounted on the bottom of the bin structure, and associated elements. The additional weight resulting from accumulation of the grain in the bin is distributed so as to eliminate any stress on any part of the supporting frame structure which would interfere with the operation of the machine or cause a breakdown. The arrangement provides optimum utilization of space and weight and enables a relatively large amount of storage space to be provided for the grain in the machine without increasing the height or width of the machine to an undesirable extent.

We claim:

1. A combine harvester for grain crops comprising a main support frame for mounting thereon crop gathering and threshing devices, said main support frame including transversely spaced, upstanding main side frame members and a top connecting structure which extends between the tops of said side frame members and cooperates therewith to define a compartment for housing said threshing devices, said top connecting structure constituting an integral part of said main support frame and forming a grain storage bin structure with substantially the entire floor of said grain storage bin structure forming a roof for said compartment, and said grain storage bin structure having sidewalls upstanding from said floor and extending above said compartment so as to provide storage space the major portion of which is directly above said compartment for temporarily storing a predetermined quantity of grain.

2. A crop harvester comprising a vehicle having a main frame adapted to support apparatus for gathering and threshing grain crops, said main frame including upstanding structural side frame elements on opposite sides of the vehicle which are spaced so as to define the sides of a bottom compartment for housing the crop threshing apparatus, and a bin structure for storage of grain resulting from the operation of the threshing apparatus, which bin structure is constructed as an integral part of said main frame with a floor forming bottom wall portion connecting the top portions of the side frame elements and substantially the entire floor forming also a roof for said compartment, said bin structure having its major grain accommodating area extending above said compartment and including side and end walls upstanding from said bottom wall and laterally spaced, longitudinal auger troughs and an unloading cross trough on said bottom wall, said cross trough having a connection with the longitudinal troughs so as to enable grain to be fed from the longitudinal troughs into the cross trough.

3. A combine harvester as set forth in claim 2, wherein said grain storage bin structure extends on opposite sides of said main support frame and includes a bottom wall with portions which are inverted V-shaped in cross section so as to provide said longitudinal auger troughs which extend along the sides of said bottom wall and above said compartment and said cross trough constituting an unloading auger trough extending along one end of the bottom wall of said storage bin at an elevation to receive grain from said longitudinal auger troughs and having an auger therein to move the grain laterally out of said storage bin.

* * * * *